2,958,571

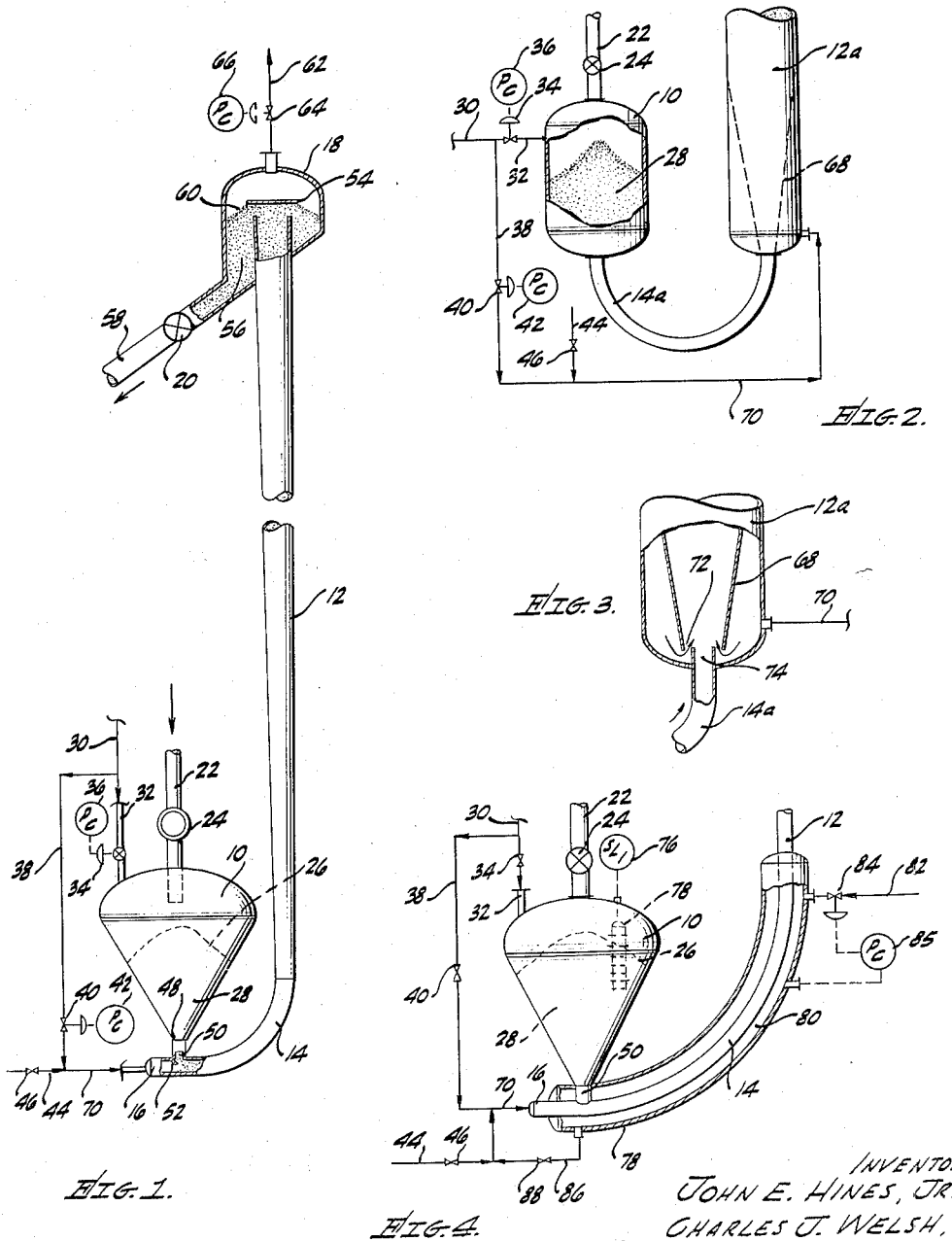

SOLIDS CONVEYANCE PROCESS AND APPARATUS

John E. Hines, Jr., Long Beach, and Charles J. Welsh, Orange, Calif., assignors to Union Oil Company of California, Los Angeles, Calif., a corporation of California Filed Apr. 2, 1956, Ser. No. 575,375

17 Claims. (Cl. 23—1)

This invention relates to the conveyance of granular solid material such as the granular contact catalysts used in hydrocarbon cracking, reforming, desulfurization, and other processes. This invention particularly relates to the conveyance of such solids while maintaining them at their static bulk density in the form of a fluid-permeable and continuous compact mass and simultaneously treating the solids with a fluid during conveyance.

In continuous contacting processes using recirculated streams of solid contact material, the solids are passed through a contacting zone and then through a solids regeneration zone to restore the contacting activity. Obviously an essential part of any such process is the solids recirculation system. In the past bucket elevators have been employed to circulate solids, but these suffer such disadvantages as low capacity, high expense, low maximum operating pressure, and difficult maintenance problems. Circulation of solids in such processes by passing a suspension thereof through a conduit has been used in some cases. This is the so-called dilute phase gas lift, or pneumatic conveyance of solids. This gas lift system has disadvantages in the form of excessively high attrition rates, high conveyance velocities giving suspension formation and settling problems. Such gas lift conveyors do operate well at high pressures and have no moving mechanical parts. Another problem however involves the very short residence time of the solids in either of these types of conveyors. A bucket elevator will convey solids from the bottom to the top in about 30 to 45 seconds in a typical catalytic cracking operation. The pneumatic or gas lift conveyor has an even shorter residence time of the order of 4 to 5 seconds. It is obvious that no material degree of solids treating can be effected in these short times in either of these types of conveyors.

A recent improvement in the field of solids conveyance permits the controlled upward movement of the solids in a conduit while maintaining them in a dense compact form in which the solids are non-fluidized and in which, at all times each particle touches the particles surrounding it. This type of conveyance is characterized by an infinite control of residence time of the solids in the conveyance zone and a density of material being conveyed which is substantially equal to the static bulk density of the solids when at rest. The solids may be made to move upward at very high rates, of the order of 800 tons per hour in a line 14 inches in diameter. The solids may also be controlled to move upwardly at an imperceptibly slow rate thus giving residence times therein of 10 to 20 hours with no trouble whatsoever.

The present invention therefore involves an improvement in solids conveyance utilizing an improved form of compact solids conveyance which permits the movement of solids at higher rates and more smoothly while avoiding the previously mentioned problems. The present invention is also directed to an improved process and apparatus for the simultaneous conveyance and treatment of granular solids with a fluid.

It is accordingly an object of this invention to provide an improved solids conveyance process.

It is another object to provide an improved process which recirculates solids in solids-fluid contacting processes wherein the solids are conveyed as a fluid-permeable compact mass substantially at their solids static bulk density.

It is a specific object of this invention to improve the mode of engagement of the solids to be conveyed with the conveyance fluid at the lift line inlet.

It is another specific object to provide an improved method for the upflow contacting of a compact mass of granular solids with a fluid which is adapted to improve heat transfer, as in the oxidative exothermic regeneration of spent hydrocarbonaceous catalysts and other solid contact materials used in hydrocarbon refining.

It is also an object of this invention to provide an apparatus adapted to accomplish the foregoing objects.

Other objects and advantages of this invention will become apparent to those skilled in the art as the description and illustration thereof proceed.

Briefly, the present invention comprises a method for conveying granular solids smoothly and at high rates and, if desired, at closely controllable residence times in a conveyance zone. Specifically in the present invention, granular solids are conveyed by means of two conveyance fluids separately engaged with the solids to be moved in a manner which increases the rate of conveyance, eliminates the occurrence of void spaces in the moving solids mass, and permits a reduction in the conveyance length required to convey the solids to a given elevation.

The granular solids are caused to move in the conveyance zone in the form of a fluid-permeable compact mass by employing a series of novel and critical steps. First the entrance for the solids in the conveyance zone is submerged in and surrounded by a dense or compact bed of solids to be conveyed. This is accomplished by providing an induction zone or chamber into which the solids are introduced at its upper end and which surrounds the inlet opening of the conveyance zone at or near its bottom so that the solids mass covers this inlet opening. Secondly, the solids discharge at the outlet of the conveyance zone is restricted in cooperation with a solids flow control step downstream from the point of solids discharge. The rate of removal of discharged solids is thus regulated and this in turn regulates the rate of solids conveyance. This restriction may be accomplished by disposing a flat surface such as a plate or cap immediately adjacent the outlet opening and against which the moving solids bed flows and then reverses its direction to one of gravity flow. The same result may be obtained by discharging the solids from the conveyance zone against a wall or roof of the vessel into which the solids discharge, or by permitting a bed of previously discharged solids to build up and submerge the outlet of the conveyance zone. In this way the solids flow rate is controlled and the solids are prevented from becoming suspended or fluidized by or in the conveyance fluid.

Thirdly, and simultaneously with the two aforementioned steps, the forces of gravity and friction acting against the solids in the conveyor must be overcome by passing a concurrent flow of conveyance fluid through the conveyance zone controlled at a rate sufficient to generate a pressure gradient throughout the length of the conveyance zone which exceeds these forces. The ratio of the pressure gradient to the opposing force of gravity has been termed the conveyance force ratio and is given by:

$$\frac{\frac{dp}{dl}}{\rho_s \cos \theta} \quad (1)$$

wherein $$\frac{dp}{dl}$$

is the pressure gradient in pounds per square foot per foot, $\rho_s$ is the static bulk density of the solids in pounds per cubic foot, and $\theta$ is the angular deviation of the conveyance direction from a vertical upward reference axis. When the conveyance fluid flows at a rate sufficient to generate a pressure gradient equalling the value of ($\rho_s \cos \theta$), the forces of gravity are overcome. A slight additional increase in the pressure gradient sufficient to exceed the opposing force of friction will permit solids to be moved upwardly as a dense bed through the conveyance zone so long as they are supplied at the inlet and controllably removed at the outlet thereof as indicated above. The conveyance force ratio is equal to 1.0 when the forces of gravity are overcome. In the ordinary case a ratio of from about 1.05 to about 2.0 is sufficient to overcome all the opposing forces, although higher ratios may be used in specific cases.

In the present invention wherein solids are conveyed according to the system and requirements briefly outlined above, the solids are introduced with a first portion of conveyance fluid into an induction zone and passed downwardly together with the solids as a dense mass toward the entrance to the conveyance zone. The solids and this first portion of conveyance fluid flow from the lower outlet of the induction zone into an arcuate inlet section of the conveyance zone. A second portion of conveyance fluid is introduced directly into the arcuate inlet section, combined with the first portion of fluid previously introduced, and the mixture flows concurrently through the solids mass in the conveyance zone. This double introduction of fluid at the entrance to the conveyance zone substantially increases the maximum permissible solids flow rate, substantially improves the control of solids flow when high residence times and low solids velocities in the conveyor are required, and eliminates the existence of void spaces sometimes occurring in dense solids conveyance.

A specific application of the conveyance process of this invention is in the simultaneous conveyance and fluid treating of granular solids in recirculatory solids-fluid contacting processes. One application of this invention is in the simultaneous conveyance and regeneration of spent granular solids in hydrocarbon treating operations. In this application the first portion of conveyance fluid introduced through the induction zone comprises a non-oxidizing fluid such as carbon dioxide, nitrogen, steam below about 1000° F., oxygen-free flue gas, methane, natural gas, other fuel gases, or the like. These are inert fluids with respect to the solids and no chemical reaction occurs. This flow permits the smooth and continuous introduction of spent solids into the arcuate inlet section. The second portion of conveyance fluid comprises an active fluid, for example an oxygen-containing gas such as air, or oxygen-containing flue gas, or the like which chemically reacts in the lift line. The mixture of the two fluids in passing upwardly through the conveyance zone simultaneously conveys and regenerates the solids so that they may be re-introduced directly into the hydrocarbon treating zone. This prevents premature regeneration in the induction zone.

In the case of contact material used to treat straight-run gasolines for example and in which the quantity of "coke" on the spent solids is low, or where additional heat is needed, the first portion of conveyance fluid may be a combustible fuel gas and the second portion of conveyance fluid may again be an oxygen-containing gas such as air. In other cases when the quantity of coke on the solids is higher, the second portion of conveyance fluid must be controlled to have a lower oxygen concentration such as between about 0.5 and 10 percent by volume. In this case flue gas and air mixtures may be conveniently used, or the air may be diluted with any other available inert gas.

The present invention will be more readily understood by reference to the accompanying drawings and the description of the figures therein in which:

Figure 1 is an elevation view in partial cross section of the conveyance apparatus of this invention in which the double conveyance fluid introduction is employed, Figure 2 is an elevation view in partial cross section of a modification of the lower or inlet end of the conveyance apparatus, Figure 3 is a detailed elevation view of the bottom of the conveyance zone showing the means whereby the second conveyance fluid portion is engaged with the solids in the Figure 2 modification, and Figure 4 is an elevation view in partial cross section of the Figure 1 modification of this invention modified for application to the simultaneous conveyance and exothermic treating of solids contact material.

Referring now more particularly to Figure 1, the apparatus of the present invention consists essentially of induction zone 10, conveyance zone 12 having an arcuate inlet section 14 having an upstream end 16 which is substantially horizontal, solids receiving zone 18, and solids flow control means 20. Solids to be conveyed, and treated if desired, are introduced at the top of induction zone 10 through line 22 controlled by means 24. Control means 24 may comprise a continuous pressuring solids feeder whereby solids pass downwardly as a continuous stream through line 22 against a reverse pressure gradient. Element 24 may also comprise a remotely controlled valve whereby solids are intermittently introduced to and pressured into induction zone 10 in which case the induction zone acts as a surge vessel, upper level 26 of solids mass 28 varying in position with solids introduction, but always in any case submerging outlet 48.

The conveyance fluid under pressure passes through line 30 and is divided into a first and second portion. The first portion is introduced through line 32 at a rate controlled by valve 34 and pressure controller 36 into the top of induction zone 10. The second portion passes through line 38 at a rate controlled by valve 40 and pressure controller 42 and then through line 70 for introduction at the upstream end 16 of the conveyance conduit. If desired, a third gas portion may be introduced into line 70 through line 44 at a rate controlled by a valve 46 into combination with the second gas portion. A specific example of such an operation is in the conveyance-regeneration of spent catalyst solids using flue gas free of oxygen as the first and second conveyance gas portions and oxygen as the third gas portion. By this latter means, combustion occurs only in the lift line sections 14 and 12.

The granular solids to be conveyed flow downwardly, by gravity and the increasing force of the concurrent flow of the first conveyance fluid portion, from the lower outlet 48 of induction zone 10, through transition section 50 against inclined inlet baffle 52, and directly into the horizontal inlet end 16 of arcuate inlet section 14. Baffle 52 is optional and may be omitted if desired. At this point the solids are contacted by a horizontally flowing stream of the second portion of the conveyance fluid. The first and second conveyance fluid portions are herein admixed and flow together upwardly through the solids mass discharging together in solids receiving zone 18. The solids discharge upwardly against thrust plate 54 applying the flow restriction referred to above. The solids reverse flow direction and pass downwardly as moving mass 56 through outlet line 58 and at a rate controlled by solids flow controller 20. The conveyance fluid is disengaged from the solids through solids-fluid interface 60 and is removed therefrom through line 62 at a rate controlled by valve 64 and pressure controller 66.

In order to compensate for the effects of expansion on pressure decrease of conveyance gases and so as to provide a uniform pressure gradient and conveyance force ratio throughout the length of conveyance zone 12, this zone is preferably tapered or provided with an increasing cross sectional area in the flow direction as shown in Figure 1. If desired, this increasing cross section may be approximated by employing a plurality of interconnected coaxially aligned cylindrical sections of increasing diameter in flow direction.

Referring now more particularly to Figure 2, a modified form of induction zone 10 is shown having solids inlet 22, solids flow control means 24, conveyance fluid inlet 30, lines 32 and 38, valves 34 and 40, and pressure controllers 36 and 42 as in Figure 1. Line 44 and valve 46 are also provided for the introduction of the third fluid. In the modification shown herein the solids to be conveyed discharge downwardly directly into an arcuate conveyance zone inlet section 14a which is a 180° return bend conduit and in this instance the second conveyance fluid portion is introduced into the solids after passage through the arcuate inlet zone. This modification is characterized by an unusually high solids capacity, e.g. 18 to 20 tons per hour in a 3-inch diameter line. The lower end of a modified conveyance zone 12a is also shown containing an internal transition section 68 in the form of an inverted cone. The second conveyance fluid portion flows through line 70 into the bottom of conveyance zone 12a around the transition section for engagement with the solids. The lower portion of the transition section is provided with apertures permitting the inflow of this fluid.

The detail in Figure 3 indicates one modification of apparatus for introducing the second conveyance fluid portion in the apparatus shown in Figure 2. Herein conveyance zone 12a, internal cone transition section 68, gas inlet line 70, and 180° arcuate inlet section 14a are shown. The lower inlet opening 72 of the conical transition section 68 is spaced upwardly from the bottom of conveyance zone 12a and has a diameter which is greater than that of outlet opening 74 of the arcuate return bend section 14a. This provides an annular aperture through which only a small and limited amount of solids may pass downwardly in shutdown conditions, but through which the second conveyance portion readily passes upwardly into admixture with the first conveyance fluid portion and the solids to be conveyed.

Referring now more particularly to Figure 4, a modification of the apparatus in Figure 1 is shown, and which can readily be applied also to the modification shown in Figure 2, for use in those applications in which the process and apparatus of this invention are applied to the simultaneous conveyance and upflow contacting of solids in which a chemical reaction occurs and in which heat is either to be added or recovered or the walls of the apparatus are to be cooled, and in which premature reaction in induction zone 10 (Figure 1 or 2) is undesirable.

In Figure 4, the elements which are also shown in Figure 1 are herein designated by the same numbers, and reference is made to the description of Figure 1 for a description of these elements and their operation. Added in the apparatus shown is solids level indicator 76 which is actuated by an elongated grid structure 78 disposed within induction zone 10 and through solids level 26 which serves to indicate the quantity of solids contained in vessel 10.

As shown in Figure 4, the arcuate inlet section 14 and a portion of the lower linear part of conveyance zone 12 is surrounded coaxially with a jacket 78 providing a heat exchange or pressure zone 80 surrounding the lower part of the conveyance zone. By introducing a fluid into zone 80 through line 82 controlled by valve 84 and pressure controller 85, annular zone 80 may be maintained at any desired pressure. If this fourth fluid so introduced into annular zone 80 comprises a portion of conveyance fluid introduced through line 30, jacket 78 may be made to withstand the operating pressure of the conveyance fluid thereby relieving return bend inlet section 14 of this stress. This procedure is of advantage when the conveyance zone, particularly its arcuate inlet section, has been internally surface hardened which frequently causes embrittlement of the metal and substantial strength reduction.

In those cases in which upflow regeneration of solids is simultaneously effected with the conveyance, heat is liberated from the solids and it may be recovered in preheating the regeneration fluid passed through zone 80. Simultaneously, if desired, annular zone 80 may constitute such a preheating zone as well as a pressure zone. In this modification a portion of the regeneration fluid is introduced through line 82, passes through annular zone 80 in which it is preheated indirectly by the liberated heat of regeneration, and the preheated regeneration fluid passes therefrom through line 86 at a rate controlled by valve 88 into gas inlet line 70 opening into the inlet end 16 of arcuate inlet section 14. In this manner the first portion of conveyance fluid passes downwardly through solids bed 28 and through transition section 50 into the conveyance zone. A second conveyance fluid portion may pass through line 38 directly into inlet section 16 or all or a portion thereof may be passed through line 82 through preheating zone 80 into inlet section 16. Again a third conveyance fluid portion comprising an oxygen-containing gas is introduced through line 44.

Obviously, in an appropriate operation, the solids can be heated in a similar manner by passing a hot fluid through annular zone 80.

In Figure 4 jacket 78 is shown surrounding the arcuate inlet section 14 and only the lower linear portion of zone 12. This comprises the lower portion of the conveyance zone 12. If additional heat exchange area is required, jacket 78 may be extended farther upward along the vertical or linear portion of the conveyance zone 12, and even to its upper outlet opening if necessary.

As an example of the present invention applied in the simultaneous conveyance and regeneration of spent hydrocarbon reforming catalyst the following data are given. Low grade hydrocarbon naphtha was reformed in the presence of hydrogen at an average temperature of 900° F. and pressure of 400 p.s.i. at a rate of 1100 barrels per day in contact with an alumina-supported cobalt molybdate reforming and desulfurization catalyst. The conveyance-regeneration zone was 13 inches in diameter, was provided with a coaxial jacket surrounding the lower 15 feet of the conveyance-regeneration zone, and simultaneously conveyed and regenerated spent catalyst containing about 4.5 percent coke at a rate of 860 pounds per hour. The conveyance fluid comprised essentially flue gas. The first portion of flue gas was introduced through the induction zone at a rate of about 350 M s.c.f. (one M s.c.f. equals 1000 standard cubic feet) per day. The second portion was introduced through the annular preheating and pressure zone at a rate of about 1262 M s.c.f. per day in which it was preheated to a temperature of about 800° F. This preheated flue gas was admixed with air as the third fluid portion at a rate of 123 M s.c.f. per day and introduced directly into the upstream end of the arcuate inlet section of the conveyance regeneration zone. This maintained an entrance gas temperature of about 700° F. insuring that the coked catalyst would ignite and burn. The maximum catalyst temperature was about 1075° F., the catalyst was discharged at the top of the conveyance-regeneration zone containing less than 0.2 percent coke, and the catalyst mass moved upwardly at a linear rate of about 5 feet per hour.

The arcuate inlet section was surface hardened on the inside. The entrance pressure of the conveyance-regeneration zone was about 440 p.s.i. and jacket 78 was maintained at a pressure of about 442 p.s.i. by the passage therethrough of the second conveyance fluid portion.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. A method for conveying granular solids which comprises introducing solids to be conveyed into an induction zone, maintaining therein a mass of said solids submerging the outlet therefrom opening into an elongated conveyance zone, passing a first portion of conveyance fluid through said mass of solids in said induction zone into said conveyance zone, passing a second portion of conveyance fluid directly into said conveyance zone adjacent the upstream end thereof, passing the combined fluids through said conveyance zone at a rate sufficient to overcome forces acting on the solids and opposing solids flow, and restricting the flow of the mass of solids discharging from the outlet of said conveyance zone to maintain said outlet submerged in said mass of solids and to maintain the solids in said conveyance zone at a bulk density substantially equal to the static bulk density of said solids when at rest.

2. A method according to claim 1 in combination with an arcuate inlet portion at the entrance of said conveyance zone and connecting it to said outlet from said induction zone.

3. A method according to claim 2 wherein said second conveyance fluid portion is introduced at the upstream end of said arcuate inlet portion.

4. A method according to claim 2 wherein said second conveyance fluid portion is introduced at the downstream end of said arcuate inlet portion.

5. A method according to claim 1 wherein said first portion of conveyance fluid is an inert fluid with respect to said solids, so that no chemical reaction occurs in said induction zone, and wherein said second conveyance fluid portion is an active fluid so that a chemical reaction occurs in said conveyance zone.

6. A method according to claim 5 in combination with the step of passing a fluid in indirect heat exchange relation to the solids in at least part of said conveyance zone.

7. A method for the conveyance of granular solids which comprises maintaining a moving mass of solids to be conveyed in an induction zone so as to submerge the solids outlet therefrom, discharging solids through said outlet downwardly into the horizontal upstream end of an arcuate inlet portion of an elongated conveyance zone, passing a first portion of conveyance fluid downwardly through said moving mass of solids and therewith into said arcuate inlet portion, passing a second portion of conveyance fluid horizontally into said arcuate inlet portion into admixture with said first portion and then concurrently with said solids through said arcuate inlet portion and on through said conveyance zone at a rate sufficient to overcome forces acting on the solids and the opposing solids flow, and restricting the discharge of said solids at the outlet to maintain said outlet submerged in said mass of solids and to maintain said solids during conveyance as a mass having substantially their static bulk density.

8. A method according to claim 7 in combination with a zone surrounding at least the arcuate inlet portion of said conveyance zone, in combination with the step of maintaining said last named zone at a pressure substantially equal to that of said conveyance fluid flowing in the arcuate inlet portion of said conveyance zone.

9. A method according to claim 8 wherein the pressure surrounding said arcuate inlet portion is maintained by the step of passing a portion of said conveyance fluid therethrough prior to its introduction into said conveyance zone.

10. A method according to claim 7 in combination with the step of conducting a chemical reaction in the presence of said solids only in said conveyance zone wherein said first portion of said conveyance fluid is inert relative to said solids, and said second portion of conveyance fluid is an active fluid which reacts chemically during its passage through said conveyance zone.

11. A method according to claim 10 wherein said first portion of conveyance comprises a fuel gas, and said second portion comprises a gas containing oxygen which reacts in the conveyance zone to liberate heat and thereby heat said solids.

12. A method according to claim 10 wherein said solids contain a combustible carbonaceous deposit, wherein said first portion of conveyance fluid comprises an oxygen-free gas, and wherein said second portion comprises an oxygen-containing gas which simultaneously conveys and burns off said deposit from said solids in said conveyance zone.

13. An apparatus for the conveyance of granular solids which comprises a vertically elongated conveyance conduit provided with an arcuate inlet conduit portion at its lower end, an induction chamber opening at its lower end into the inlet end of said arcuate conduit portion, a solids inlet at the top of said induction chamber, valve means located in said solids inlet for controlling the flow of solids into said induction chamber, a first conveyance fluid inlet in the upper portion of said induction chamber, a first control means located in said first conveyance fluid inlet for controlling the flow of conveyance fluid into said induction chamber, a second conveyance fluid inlet opening into one end of said arcuate inlet conduit portion, second control means located in said second conveyance fluid inlet for controlling the flow of conveyance fluid into said arcuate inlet conduit portion, a solids and fluid receiving chamber disposed at the outlet end of said conveyance conduit, thrust plate means adjacent the outlet end of said conveyance conduit in said receiving chamber adapted to apply a compacting force to discharging solids and maintain them in compact unfluidized form in said conveyance conduit.

14. An apparatus according to claim 13 wherein said arcuate inlet conduit portion of said conveyance conduit curves from a substantially horizontal direction at its inlet end below said induction chamber to a direction tangent to the axis of the next portion of said conveyance conduit, and said second conveyance fluid inlet opens horizontally into the horizontal end of said arcuate inlet conduit portion.

15. An apparatus according to claim 13 wherein said arcuate inlet conduit portion of said conveyance conduit curves from a substantially vertical downward direction at its inlet end immediately below said induction chamber to a direction tangent to the axis of the next portion of said conveyance conduit, and said second conveyance fluid inlet opens into said conveyance conduit substantially at the outlet end of said arcuate inlet conduit portion.

16. An apparatus according to claim 13 in combination with a pressure resistant jacket surrounding at least the arcuate inlet conduit portion of said conveyance conduit and integrally attached thereto at its ends, an inlet for a fluid opening through said jacket into the space between it and said arcuate inlet conduit portion, and means for controlling the fluid pressure in said space.

17. An apparatus according to claim 16 in combination with a conduit opening from said jacket and communicating with said conveyance conduit whereby a fluid passes through said jacket, in indirect heat exchange relation to the solids in said arcuate inlet conduit portion, and then into said conveyance conduit.

References Cited in the file of this patent

UNITED STATES PATENTS

| | | |
|---|---|---|
| 2,231,424 | Huppke | Feb. 11, 1941 |
| 2,642,346 | Keith | June 16, 1953 |
| 2,685,498 | Dickinson | Aug. 3, 1954 |
| 2,734,782 | Galle | Feb. 14, 1956 |
| 2,758,059 | Berg | Aug. 7, 1956 |
| 2,792,262 | Hathorn | May 14, 1957 |
| 2,804,368 | Summers | Aug. 27, 1957 |

FOREIGN PATENTS

| | | |
|---|---|---|
| 1,020,780 | France | Nov. 19, 1952 |